United States Patent
Xia et al.

(10) Patent No.: US 12,199,876 B2
(45) Date of Patent: Jan. 14, 2025

(54) TRANSMISSION CONTROL METHOD AND APPARATUS

(71) Applicant: HUAWEI TECHNOLOGIES CO., LTD., Guangdong (CN)

(72) Inventors: Bin Xia, Dongguan (CN); Feng Zeng, Boulogne Billancourt (FR); Xiaoshan Zhang, Dongguan (CN); Yuechen Li, Dongguan (CN); Hao Li, Dongguan (CN); Runfa Zhou, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/467,765

(22) Filed: Sep. 15, 2023

(65) Prior Publication Data

US 2024/0007406 A1    Jan. 4, 2024

Related U.S. Application Data

(63) Continuation of application No. PCT/CN2022/080940, filed on Mar. 15, 2022.

(30) Foreign Application Priority Data

Mar. 17, 2021    (CN) .......................... 202110287748.4

(51) Int. Cl.
*G06F 15/16* (2006.01)
*H04L 47/125* (2022.01)
(Continued)

(52) U.S. Cl.
CPC ............ *H04L 47/20* (2013.01); *H04L 47/125* (2013.01); *H04L 47/127* (2013.01); *H04L 47/52* (2013.01)

(58) Field of Classification Search
CPC ....... H04L 47/20; H04L 47/52; H04L 47/125; H04L 47/127
(Continued)

(56) References Cited

U.S. PATENT DOCUMENTS 7,633,880 B2 * 12/2009 Bang .................. H04L 49/9078
370/252
8,228,797 B1 * 7/2012 Utley .................. H04L 47/6255
370/414
(Continued)

FOREIGN PATENT DOCUMENTS

CN    105245463 A    1/2016
CN    109428830 A    3/2019
(Continued)

OTHER PUBLICATIONS

International Search Report and Written Opinion issued in PCT/CN2022/080940 dated May 26, 2022, 10 pages.

*Primary Examiner* — Moustafa M Meky (57) ABSTRACT

The technology of this application relates to a transmission control method and apparatus. The method includes obtaining traffic information of a first node at M sample moments, where M is a positive integer greater than or equal to 1, determining first traffic information of the first node at a first moment based on the traffic information of the first node at the M sample moments, where the first moment does not belong to the M sample moments, determining first rate-limited traffic based on the first traffic information, where the first rate-limited traffic indicates maximum traffic that is allowed to pass through a first queue of the first node at the first moment, and limiting traffic of the first queue at the first moment based on the first rate-limited traffic.

20 Claims, 4 Drawing Sheets

(51) Int. Cl.
  *H04L 47/127*   (2022.01)
  *H04L 47/20*    (2022.01)
  *H04L 47/52*    (2022.01)

(58) Field of Classification Search
  USPC ........................................................ 709/238
  See application file for complete search history.

(56)            References Cited

U.S. PATENT DOCUMENTS

|    |    |    |    |    |
|---|---|---|---|---|
| 9,843,540 | B2* | 12/2017 | Agarwal | H04L 47/6295 |
| 10,129,167 | B2* | 11/2018 | Szymanski | H04L 47/629 |
| 10,237,199 | B2* | 3/2019 | Szymanski | H04L 47/30 |
| 10,708,192 | B2* | 7/2020 | Szymanski | H04L 47/20 |
| 11,238,041 | B2* | 2/2022 | Kondiles | G06F 16/24542 |
| 11,582,152 | B2* | 2/2023 | Chandrashekar | H04L 47/12 |
| 11,893,017 | B2* | 2/2024 | Kondiles | G06F 16/2455 |
| 2019/0140984 | A1* | 5/2019 | Agarwal | H04L 47/2475 |
| 2019/0230042 | A1* | 7/2019 | Szymanski | H04L 47/50 |
| 2023/0185801 | A1* | 6/2023 | Kondiles | G06F 16/2471 |
|   |   |   |   | 707/718 |
| 2023/0362099 | A1* | 11/2023 | Tilmans | H04L 47/28 |
| 2024/0111768 | A1* | 4/2024 | Kondiles | H04L 45/02 |

FOREIGN PATENT DOCUMENTS

| CN | 112422440 A | 2/2021 |
|---|---|---|
| EP | 2302847 A1 | 3/2011 |

\* cited by examiner

TRANSMISSION CONTROL METHOD AND APPARATUS

CROSS-REFERENCE TO RELATED APPLICATIONS

This application is a continuation of International Application No. PCT/CN2022/080940, filed on Mar. 15, 2022, which claims priority to Chinese Patent Application No. 202110287748.4, filed on Mar. 17, 2021. The disclosures of the aforementioned applications are hereby incorporated by reference in their entireties.

TECHNICAL FIELD

Embodiments of this application relate to the field of communication technologies, and in particular, to a transmission control method and apparatus.

BACKGROUND

With development of information technologies, new services and new application scenarios emerge one after another. As a result, data traffic in a communication network is increasingly large, and network congestion occurs frequently. At present, network congestion has gradually become one of common causes of deterioration of network quality of service. Therefore, how to relieve deterioration of network quality of service caused by network congestion is a problem that needs to be resolved.

SUMMARY

A transmission control method and apparatus provided in this application are used to reduce deterioration of network quality of service caused by network congestion. To achieve the foregoing objective, this application provides the following technical solutions:

According to a first aspect, this application provides a transmission control method, including: obtaining traffic information of a first node at M sample moments, where M is a positive integer greater than or equal to 1; determining first traffic information of the first node at a first moment based on the traffic information of the first node at the M sample moments, where the first moment does not belong to the M sample moments; determining first rate-limited traffic based on the first traffic information, where the first rate-limited traffic indicates maximum traffic that is allowed to pass through a first queue of the first node at the first moment; and limiting traffic of the first queue at the first moment based on the first rate-limited traffic.

In the foregoing method, traffic information of the first node at the first moment is first predicted by using the traffic information of the first node at the M sample moments. Then, the maximum traffic that is allowed to pass through the first queue of the first node at the first moment is determined based on predicted first traffic information. Then, the traffic of the first queue at the first moment is limited based on the maximum traffic that is allowed to pass through the first queue at the first moment. Therefore, when it is predicted that congestion may occur at the first moment, the traffic of the first queue is limited, to ensure an effect of normal traffic transmission of another queue (which may be a queue for transmitting a service with higher importance).

In a possible implementation, the first traffic information indicates total traffic entering a queue other than the first queue of a first interface at the first moment. The first interface is an interface for transmitting the first queue. The determining first rate-limited traffic based on the first traffic information includes: determining, based on the first traffic information, remaining bandwidth obtained by subtracting the total traffic from total available bandwidth of the first interface; and determining the first rate-limited traffic based on the remaining bandwidth.

According to the foregoing implementation, when the traffic of the first queue at the first moment is limited based on the first rate-limited traffic, this can ensure smooth transmission of traffic of another queue, and avoid limiting the traffic of the first queue to an excessively small value.

In a possible implementation, the determining the first rate-limited traffic based on the remaining bandwidth includes: determining the first rate-limited traffic based on the remaining bandwidth and an impact factor. The impact factor may include at least one of the following: a congestion data volume of the first interface in a first time period, a quantity of changes of bandwidth allocated to the first queue in the first time period, and variation amplitude of the bandwidth allocated to the first queue in the first time period. The first time period includes the first moment.

According to the foregoing implementation, when the traffic of the first queue is limited to ensure traffic transmission of another queue, this can avoid a problem of frequent adjustment of rate limit configuration and a problem of high traffic fluctuation.

In a possible implementation, the limiting traffic of the first queue at the first moment based on the first rate-limited traffic includes: sending first configuration information to the first node based on the first rate-limited traffic. The first configuration information indicates the first node to set maximum bandwidth of the first queue at the first moment.

According to the foregoing implementation, this can achieve an effect of limiting the traffic of the first queue at the first moment.

In a possible implementation, the limiting traffic of the first queue at the first moment based on the first rate-limited traffic includes: sending second configuration information to at least one second node based on the first rate-limited traffic. The second node is an upstream node of the first node, and the second configuration information indicates the at least one second node to set maximum bandwidth of an upstream queue of the first queue at the first moment.

According to the foregoing implementation, this can achieve the effect of limiting the traffic of the first queue at the first moment.

In a possible implementation, the sending second configuration information to at least one second node based on the first rate-limited traffic includes: for each of the at least one second node, determining second rate-limited traffic of a second queue in a queue set at the first moment based on the first rate-limited traffic and a weight of the second queue, where the second queue is an upstream queue of the first queue of the second node, and the queue set is a set of an upstream queue of the first queue of the at least one second node; and sending the second configuration information to the second node based on the second rate-limited traffic, where the second configuration information indicates the second node to set maximum bandwidth of the second queue at the first moment.

According to the foregoing implementation, on the premise that the effect of limiting the traffic of the first queue at the first moment is achieved, this can limit, based on weights of different queues in the queue set (the weights may be determined by information such as a priority of the queue), maximum bandwidth of the upstream queue (including the second queue) of the first queue. In this way, a problem that the maximum bandwidth of the queue does not match the priority of the queue is avoided.

In a possible implementation, the limiting traffic of the first queue at the first moment based on the first rate-limited traffic includes: sending third configuration information to user equipment based on the first rate-limited traffic. The user equipment is a device that sends a data flow of a service carried in the first queue, and the third configuration information indicates the user equipment to limit a data volume transmitted by using the first queue at the first moment.

According to the foregoing implementation, this can limit transmission time and a traffic volume of service traffic in the user equipment, to achieve an effect of limiting the traffic of the first queue at the first moment.

In a possible implementation, before the determining first traffic information of the first node at a first moment based on the traffic information of the first node at the M sample moments, the method further includes: training a machine learning model by using traffic information of the first node at H sample moments to obtain a prediction model, where H>M; and the determining first traffic information of the first node at a first moment based on the traffic information of the first node at the M sample moments includes: determining the first traffic information based on the traffic information of the first node at the M sample moments and the prediction model.

In the foregoing implementation, the first traffic information is determined by using the machine learning model, so that the first traffic information can be quickly and accurately determined.

In a possible implementation, the first queue is a queue that meets at least one of the following: delay sensitivity of a service carried in the queue is lower than preset delay sensitivity, importance of the service carried in the queue is lower than preset importance, and a priority of the queue is lower than a preset priority.

According to the foregoing implementation, this can determine a more appropriate first queue, to ensure, by limiting the traffic of the first queue, service transmission of another queue with a higher requirement on quality of service.

According to a second aspect, a transmission control apparatus is provided, including: an obtaining unit, configured to obtain traffic information of a first node at M sample moments, where M is a positive integer greater than or equal to 1; a determining unit, configured to determine first traffic information of the first node at a first moment based on the traffic information of the first node at the M sample moments, where the first moment does not belong to the M sample moments, where the determining unit is further configured to determine first rate-limited traffic based on the first traffic information, where the first rate-limited traffic indicates maximum traffic that is allowed to pass through a first queue of the first node at the first moment; and a traffic limiting unit, configured to limit traffic of the first queue at the first moment based on the first rate-limited traffic.

In a possible implementation, the first traffic information indicates total traffic entering a queue other than the first queue of a first interface at the first moment. The first interface is an interface for transmitting the first queue. The determining unit is specifically configured to determine, based on the first traffic information, remaining bandwidth obtained by subtracting the total traffic from total available bandwidth of the first interface. The determining unit is further specifically configured to determine the first rate-limited traffic based on the remaining bandwidth.

In a possible implementation, the determining unit is specifically configured to determine the first rate-limited traffic based on the remaining bandwidth and an impact factor. The impact factor includes at least one of the following: a congestion data volume of the first interface in a first time period, a quantity of changes of bandwidth allocated to the first queue in the first time period, and variation amplitude of the bandwidth allocated to the first queue in the first time period. The first time period includes the first moment.

In a possible implementation, the transmission control apparatus further includes a sending unit. The sending unit is configured to send first configuration information to the first node based on the first rate-limited traffic. The first configuration information indicates the first node to set maximum bandwidth of the first queue at the first moment.

In a possible implementation, the transmission control apparatus further includes a sending unit. The sending unit is configured to send second configuration information to at least one second node based on the first rate-limited traffic. The second node is an upstream node of the first node, and the second configuration information indicates the at least one second node to set maximum bandwidth of an upstream queue of the first queue at the first moment.

In a possible implementation, the sending unit is specifically configured to: for each of the at least one second node, determine second rate-limited traffic of a second queue in a queue set at the first moment based on the first rate-limited traffic and a weight of the second queue, where the second queue is an upstream queue of the first queue of the second node, and the queue set is a set of an upstream queue of the first queue of the at least one second node; and send the second configuration information to the second node based on the second rate-limited traffic, where the second configuration information indicates the second node to set maximum bandwidth of the second queue at the first moment.

In a possible implementation, the transmission control apparatus further includes a sending unit. The sending unit is configured to send third configuration information to user equipment based on the first rate-limited traffic. The user equipment is a device that sends a data flow of a service carried in the first queue, and the third configuration information indicates the user equipment to limit a data volume transmitted by using the first queue at the first moment.

In a possible implementation, the apparatus further includes a model training unit. The model training unit is configured to: before the determining unit determines the first traffic information of the first node at the first moment based on the traffic information of the first node at the M sample moments, train a machine learning model by using traffic information of the first node at H sample moments to obtain a prediction model, where H>M. The determining unit is specifically configured to determine the first traffic information based on the traffic information of the first node at the M sample moments and the prediction model.

In a possible implementation, the first queue is a queue that meets at least one of the following: delay sensitivity of a service carried in the queue is lower than preset delay sensitivity, importance of the service carried in the queue is lower than preset importance, and a priority of the queue is lower than a preset priority.

According to a third aspect, a transmission control apparatus is provided. The transmission control apparatus includes one or more processors, the one or more processors are coupled to one or more memories, and the one or more memories store a computer program. When the one or more processors execute the computer program, the transmission control apparatus is enabled to perform the transmission control method according to the first aspect or the implementations of the first aspect.

According to a fourth aspect, a chip is provided. The chip includes a processing circuit and an interface, and the processing circuit is configured to invoke, from a storage medium, a computer program stored in the storage medium and run the computer program, to perform the transmission control method according to the first aspect or the implementations of the first aspect.

According to a fifth aspect, a computer-readable storage medium is provided. The computer-readable storage medium stores instructions. When the instructions are run, the transmission control method according to the first aspect or the implementations of the first aspect is performed.

According to a sixth aspect, a computer program product is provided. The computer program product includes instructions. When the computer program product is run on a computer, the computer is enabled to perform the method according to the first aspect or the possible implementations of the first aspect.

For a technical effect brought by any implementation method in the second aspect to the sixth aspect, refer to technical effects brought by different implementations in the first aspect.

DESCRIPTION OF EMBODIMENTS

The following describes the technical solutions in embodiments of this application with reference to the accompanying drawings in embodiments of this application. In embodiments of this application, words such as "first" and "second" are used to distinguish between same items or similar items having basically same functions and effects. A person skilled in the art may understand that the terms such as "first" and "second" do not limit a quantity and an execution sequence, and the terms such as "first" and "second" do not indicate a definite difference. In addition, in embodiments of this application, the word "example" or "for example" is used to represent giving an example, an illustration, or a description. Any embodiment or implementation scheme described as an "example" or "for example" in embodiments of this application should not be explained as being more preferred or having more advantages than another embodiment or implementation scheme. Use of the word such as "example" or "for example" is intended to present a relative concept in a specific manner for ease of understanding.

The following describes related technologies in embodiments of this application.

1. Bandwidth

Bandwidth is also referred to as transmission bandwidth or a throughput, and indicates a data volume that can be transmitted in a unit of time (for example, 1 second). A unit of bandwidth may be bit per second, that is, bit/s or bps. Bandwidth can be compared to a water supply network of a city to help understand meaning of bandwidth: A diameter of a water pipe may measure a capability of carrying water, and the diameter of the water pipe is similar to bandwidth. Using a broader pipe means wider bandwidth, which means a greater data transmission capability. A concept similar to bandwidth is "traffic". Compared to bandwidth, traffic indicates a data volume actually transmitted per unit of time. Based on the above example of a water supply network of a city, if the diameter of the water pipe is similar to bandwidth, traffic may be a water volume flowing through the water pipe.

2. Quality of Service (QoS)

With the rapid development of network technologies, services on the Internet become increasingly diversified. Apart from traditional applications such as a world wide web (WWW) application, an email application, and a file transfer protocol (FTP) application, many new services are expanded on the Internet such as IP phones, e-commerce, multimedia games, e-learning, telemedicine, videophones, video conferences, video on demand, and online movies.

The popularization of networks and diversified services result in a sharp increase in network traffic, which may cause network congestion, an increase in a forwarding delay, or even packet loss. Any of the preceding situations causes deterioration of quality of service or even service interruption. Increasing network bandwidth, as the most effective way to resolve network congestion, is not realistic due to operation and maintenance costs. Another effective method to resolve network congestion is to apply a policy to manage network congestion. A QoS technology is developed under this background. The QoS technology aims to provide end-to-end quality of service guarantee for various services based on different requirements of the services.

The QoS technology is a network security mechanism, and a technology for resolving problems such as a network delay and congestion. Specifically, when network congestion occurs, all packets may be discarded. To meet users' requirements for different quality of service levels of different applications, a network needs to allocate and schedule a resource based on users' requirements, and provide different QoS priorities for different packets. A packet with high real-time performance and importance is processed first. A common packet with low real-time performance is processed at a low priority. When the network is congested, the packet is even discarded. For example, a packet usually includes a preset field indicating a QoS priority of the packet, so that after obtaining the packet, a network device allocates a queue to the packet, executes a corresponding discard policy, or the like based on the QoS priority of the packet. Specifically, the network device may slow the packet to a queue of a corresponding service class based on the QoS priority of the packet. In addition, the network device may further determine a discard priority of the packet based on the QoS priority of the packet.

3. Queue

A queue, which may also be referred to as a port queue, an interface queue, or the like, is a linear table that allows an input operation to be performed at one end and a delete operation to be performed at the other end. A transmission device usually includes one or more interfaces for data input/output. Each interface may have a plurality of queues to record a processing sequence of packets in a buffer. Each queue corresponds to a queue scheduling algorithm. When congestion does not occur, a packet entering the buffer may be processed in time. When congestion occurs, the packet is in a form of a queue and is stored in a buffer of the device, waiting for processing. In this case, the transmission device selects, based on a queue scheduling algorithm corresponding to a queue, a packet from each queue for processing. In addition, when congestion is aggravated, the packet in the queue may further be discarded to relieve a problem of network overload.

The queue scheduling algorithm is a scheduling algorithm used to determine a processing sequence of packets in different queues. Common queue scheduling algorithms include strict priority (SP), priority queuing (PQ), weighted fair queuing (WFQ), low priority queuing (LPQ), and the like.

For example, in general, there are eight queues on each interface of a router device. A user may configure corresponding queue scheduling algorithms for different queues. For example, based on the queue scheduling algorithm, eight queues may be classified into three types of queues: a PQ queue, a WFQ queue, and an LPQ queue.

Generally, when a packet is scheduled from a queue, the packet is scheduled from the PQ queue first. After PQ queue scheduling is complete, the WFQ queue is scheduled. After the PQ queue scheduling and WFQ queue scheduling are complete, if there is any remaining bandwidth, the bandwidth is allocated to the LPQ queue. In this way, a packet in the PQ queue can occupy the bandwidth with an absolute priority. However, if the PQ queue is not limited, a low-priority packet (for example, a packet in the WFQ or LPQ queue) cannot obtain the bandwidth, a "starvation" phenomenon may occur. For example, generally, a router supports to configure all eight queues as the PQ queues, however, in practice, the PQ queue is configured only for a delay-sensitive service (for example, voice over internet protocol (VoIP)). In another aspect, a service flow (for example, a best effort (BE) flow) with a low service level can be scheduled by LPQ. In this way, when the network load is heavy, the BE flow can be completely limited and other services can be preferentially satisfied.

At present, with the increasing volume of data traffic in a communication network, network congestion gradually becomes one of common causes of deterioration of network quality of service. Therefore, how to reduce the deterioration of network quality of service caused by network congestion is a problem that needs to be resolved at present.

In some scenarios, the foregoing problem may be resolved by using the following technical solutions:

Solution 1: When bandwidth of some links on the network is insufficient for carrying current service traffic, or when current service traffic exceeds a congestion threshold, a service transmission path is adjusted to relieve congestion.

Figure 1:
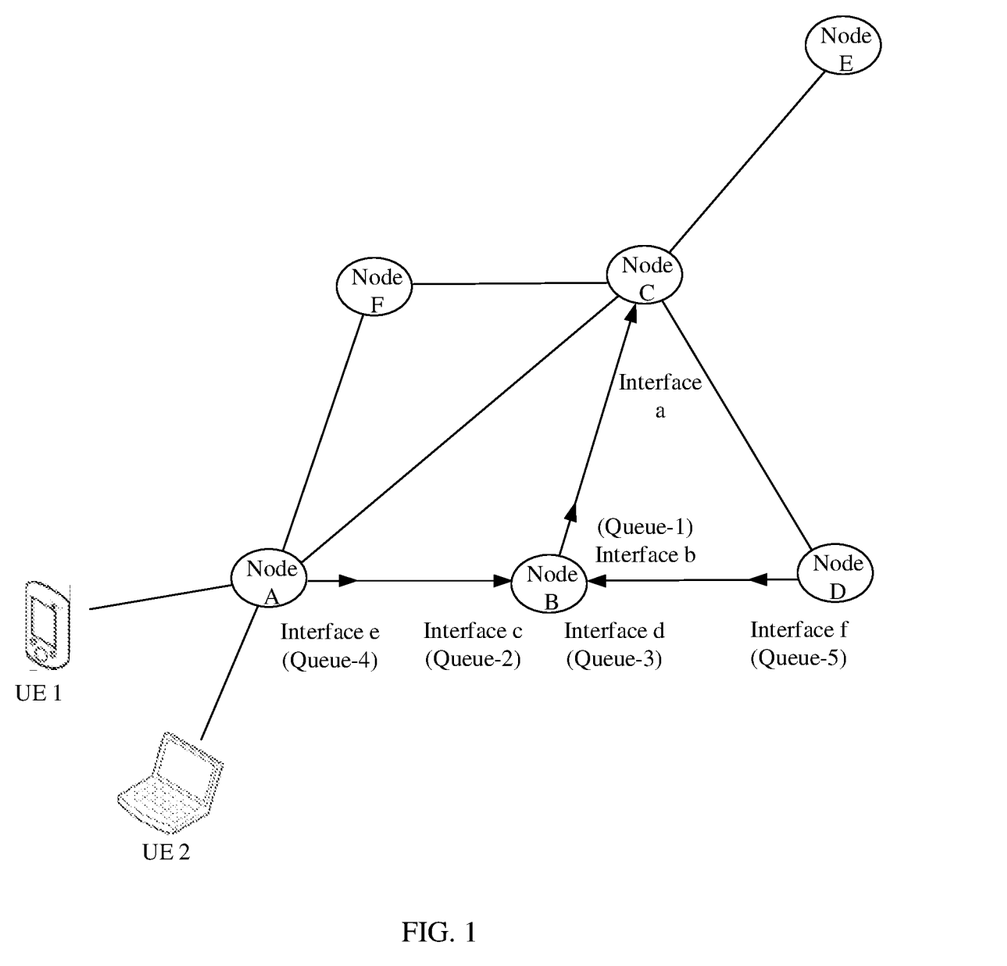
FIG. 1 is an example schematic diagram of a structure of a network according to an embodiment of this application.

FIG. 1 is a schematic diagram of a network structure. In addition, FIG. 1 is a schematic diagram of a structure of a transmission network. In this example embodiment, the transmission network includes six transmission nodes: A, B, C, D, E, and F, and service data may be transmitted through the transmission nodes.

For example, when being transmitted from the node A to the node C, the service data may be carried through two paths: A-B-C and A-F-C. In an initial state, the path A-B-C carries 90% of the service data, and the path A-F-C carries 10% of the service data. In this case, bandwidth utilization of two links A-B and B-E on the path A-B-C reaches 90%, which far exceeds a congestion threshold (70%). Further, the service transmission path may be adjusted, so that A-B-C and A-F-C each carry 50% of the service data, to relieve congestion. In this way, deterioration of network quality of service can be avoided.

For another example, when the service data is transmitted from the node A to the node B, in the initial state, a link A-B with a shortest path carries 100% of the service data. In this case, bandwidth utilization of the link A-B reaches 90%, which far exceeds the congestion threshold (70%). Further, the service transmission path may be adjusted, so that A-B and A-C-B each carry 50% of the service data, to relieve congestion. In this way, the deterioration of network quality of service can be avoided.

Although the foregoing solution can avoid the deterioration of network quality of service, the solution mainly utilizes a resource in the network in a way of moving in space to avoid congestion to the maximum extent. When no resource is available for moving in all links in the network, this solution is difficult to implement.

Solution 2: When a plurality of queues are used to carry services with different priorities, to provide bandwidth guarantee for an important service, fixed rate-limiting bandwidth may be configured for a service of a low-priority queue to ensure bandwidth of an important service with a high priority.

An interface (denoted as an interface a in the following) on the node C in FIG. 1 is used as an example. Available bandwidth of the interface a is 1000 Mbps. The interface a has five queues, including one PQ queue (marked as the queue 1) for transmitting a delay-sensitive service, and four WFQ queues (marked as the queue 2 to the queue 5) for carrying other services with different priorities. The queue 5 is a queue that carries a key service and requires maximum bandwidth guarantee. The queue 3 carries some low-priority services (such as advertisement data). In other words, fixed rate-limiting bandwidth may be configured for the queue 3 to ensure bandwidth of the queue 5.

The following Table 1 is used as an example. Table 1 describes volumes of traffic entering the five queues at moments t1, t2, and t3.

TABLE 1

| Queue | Q | W | $B_{t1}$ (Mbps) | $B_{t2}$ (Mbps) | $B_{t3}$ (Mbps) |
|---|---|---|---|---|---|
| Queue 1 | PQ | — | 100 | 100 | 100 |
| Queue 2 | WFQ | 1 | 100 | 150 | 0 |
| Queue 3 | WFQ | 2 | 300 | 200 | 200 |
| Queue 4 | WFQ | 3 | 300 | 300 | 400 |
| Queue 5 | WFQ | 3 | 400 | 400 | 450 |

Q indicates a type of a queue, W indicates a WFQ weight of the queue, $B_{tn}$ indicates traffic entering the queue at an $n^{th}$ moment. It can be learned that a total bandwidth requirement of the five queues at the t1 moment is 1200 Mbps, a total bandwidth requirement of the five queues at the t2 moment is 1150 Mbps, and a total bandwidth requirement of the five queues at the t3 moment is 1150 Mbps. In other words, the available 1000 Mbps bandwidth of the interface a cannot meet the requirement.

If a fixed maximum rate-limiting bandwidth is set to 100 Mbps for the queue 3 based on manual experience, after the maximum rate-limiting bandwidth is set for the queue 3, volumes of traffic passing through the five queues are shown in Table 2.

TABLE 2

| Queue | Q | W | $B_{t1}$ (Mbps) | $B_{t2}$ (Mbps) | $B_{t3}$ (Mbps) |
|---|---|---|---|---|---|
| Queue 1 | PQ | — | 100 | 100 | 100 |
| Queue 2 | WFQ | 1 | 100 | 150 | 0 |
| Queue 3 | WFQ | 2 | 100 | 100 | 100 |
| Queue 4 | WFQ | 3 | 300 | 300 | 400 |
| Queue 5 | WFQ | 3 | 400 | 375 | 400 |

It can be learned that the queue 5 can transmit 400 Mbps traffic at the t1 moment, the queue 5 can transmit 375 Mbps traffic at the t2 moment, and the queue 5 can transmit 400 Mbps traffic at the t3 moment. In other words, by setting maximum rate-limiting bandwidth of the queue 3 to 100 Mbps, a bandwidth requirement of the queue 5 can be ensured at the t1 moment. However, in addition to the t1 moment, the bandwidth of the queue 5 is still insufficient at the t2 moment and the t3 moment.

In other words, in the foregoing solution 2, a rate-limiting bandwidth value of the queue is set based on the manual experience, which is difficult to correspond to a burst traffic change. If the rate-limiting bandwidth is set to a too large value, a queue that carries a key service cannot ensure bandwidth at most moments. If the rate-limiting bandwidth is set to a too small value, traffic of a rate-limited queue is limited at the most moments, and network resource utilization is low.

To resolve the foregoing problem, in this embodiment of this application, future traffic of the transmission node may be predicted, and rate limiting may be performed, based on a prediction result, on a queue that carries an unimportant service, to ensure bandwidth of a queue that carries an important service.

Based on the foregoing technical principle, an embodiment of this application provides a transmission control method. The following uses the network architecture shown in FIG. 1 as an example to introduce the method provided in embodiments of this application.

Figure 2:
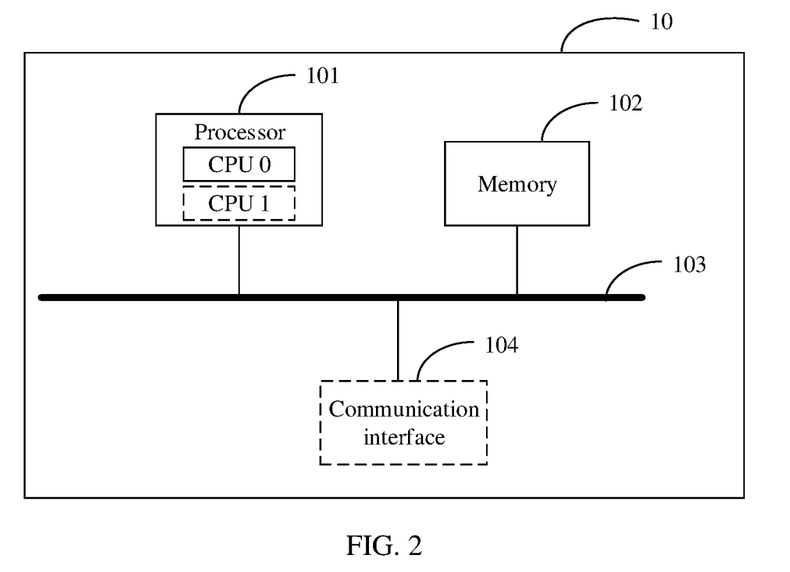
FIG. 2 is an example schematic diagram 1 of a structure of a transmission control apparatus according to an embodiment of this application.

FIG. 2 is a schematic diagram of a structure of a transmission control apparatus according to an embodiment of this application. During specific implementation, the transmission control method provided in embodiments of this application may be implemented by a transmission control apparatus 10 shown in FIG. 2. The transmission control apparatus 10 may be a transmission node in a network, or may be a hardware device that is independent of the transmission node and that can exchange data with each transmission node in the network.

The transmission control apparatus 10 includes at least one processor 101 and a memory 102. In addition, the transmission control apparatus 10 may further include a communication line 103 and a communication interface 104.

The processor 101 is configured to execute computer-executable instructions in the memory 102, to implement the transmission control method according to this application.

Specifically, the processor 101 may be a general-purpose central processing unit (CPU), a microprocessor, an application-specific integrated circuit (ASIC), or one or more integrated circuits configured to control program execution of the solutions of this application.

The memory 102 may be a read-only memory (ROM) or another type of static storage device that can store static information and instructions, random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray optical disc, and the like), a magnetic disk storage medium or another magnetic storage device, or any other medium that can be configured to carry or store program code in a form of instructions or a data structure and that can be accessed by a computer. However, the memory is not limited thereto. The memory may exist independently, and is connected to the processor through the communication line 103. Alternatively, the memory may be integrated with the processor.

The communication line 103 may include a data bus for transmitting information between the foregoing components.

The communication interface 104 is configured to communicate with another apparatus. For example, the transmission control apparatus 10 may send configuration information to the transmission node through the communication interface 104.

Figure 3:
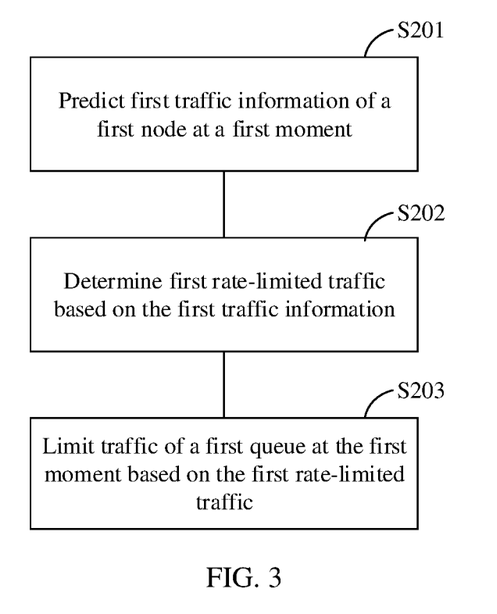
FIG. 3 is an example schematic flowchart 1 of a transmission control method according to an embodiment of this application.

Specifically, as shown in FIG. 3, the method may include S201 to S203.

S201. A transmission control apparatus predicts first traffic information of a first node at a first moment.

The first node may be any transmission node in a network. For example, in the network shown in FIG. 1, the first node may be any node in the network. That the first node is the C node is used as an example. The first traffic information of the first node at the first moment may include a volume of traffic entering one or more queues of one or more interfaces of the C node at the first moment. Which interfaces and which queues that are of the C node and whose traffic volumes are included in the first traffic information may be determined based on an actual requirement. Specific examples are provided in corresponding steps below.

During specific implementation, the transmission control apparatus may perform the method shown in FIG. 3 for the first node, or may be another device for exchanging data with the first node.

In an implementation, the first traffic information of the first node at the first moment may be predicted by using S2011 and S2012:

S2011. The transmission control apparatus obtains traffic information of the first node at M sample moments.

M is a positive integer greater than or equal to 1. In addition, the first moment does not belong to the M sample moments.

For example, each transmission node (including the first node) in the network may report, based on a preset periodicity T, real-time traffic information of each interface and each queue of the transmission node to the transmission control apparatus. After M periodicities T, the transmission control apparatus may obtain traffic information of each transmission node at the M sample moments. The preset periodicity T may be set based on an actual requirement. Specifically, T may be set to 1 min or 5 min. In an implementation, the traffic information at the M sample moments includes different moments, and traffic volumes of interfaces and queues of the first node corresponding to the different moments.

S2012. The transmission control apparatus determines the first traffic information based on the traffic information of the first node at the M sample moments.

Specifically, after receiving traffic information reported by the transmission node, the transmission control apparatus may store the traffic information in a unified manner, and keep storing traffic information reported in a specific time period, for example, storing traffic information in one week or one month. Then, the transmission control apparatus may perform sliding window prediction by using the stored traffic information, that is, continuously update traffic information at the latest moment and remove stored traffic information at the farthest moment, and further predict, based on the stored traffic information, traffic information of each transmission node at one or more subsequent moments.

For example, the first traffic information includes a volume of traffic entering a first queue of a first interface of the first node at the first moment. The traffic information of the first node at the M sample moments may be a volume of traffic of the first queue at the M sample moments. By using a related prediction technology, the volume of the traffic entering the first queue at the first moment may be determined based on the volume of the traffic of the first queue at the M sample moments.

For another example, the first traffic information includes a volume of traffic entering the first interface of the first node at the first moment, and the traffic information of the first node at the M sample moments may be a volume of traffic of the first interface at the M sample moments. By using the related prediction technology, the volume of the traffic entering the first interface at the first moment may be determined based on the volume of the traffic of the first interface at the M sample moments.

In a possible implementation, it is considered that a machine learning model that has a function of predicting traffic information at a future moment based on historical traffic information may be constructed to determine the first traffic information. Therefore, step S2012 may include:

The transmission control apparatus determines the first traffic information based on the traffic information of the first node at the M sample moments and a prediction model.

The prediction model may be a machine learning model that has a function of predicting traffic information at a future moment based on traffic information at a sample moment. For example, the prediction model is a machine learning model that can output traffic information at N future moments after traffic information at the M sample moments is input. To improve accuracy of a result, M may be set to be greater than N.

Optionally, before the first traffic information is determined based on the traffic information of the first node at the M sample moments and the prediction model, the method may further include a model training process of the prediction model: training the machine learning model by using traffic information of the first node at H sample moments, to obtain the prediction model, where H>M. Based on H>M, training samples of the prediction model may be more than input samples during prediction. This improves accuracy of the prediction model.

S202. The transmission control apparatus determines first rate-limited traffic based on the first traffic information.

For example, the first rate-limited traffic indicates maximum traffic that is allowed to pass through the first queue of the first node at the first moment.

For example, the first queue may be a queue that meets at least one of the following: delay sensitivity of a service carried in the queue is lower than preset delay sensitivity, importance of the service carried in the queue is lower than preset importance, or a priority of the queue is lower than a preset priority.

In other words, in a scenario in which rate limiting needs to be performed on the first queue to improve quality of service of a service of another queue of a transmission interface, the maximum traffic that is allowed to pass through the first queue of the first node at the first moment may be determined by using step S202.

The maximum traffic that is allowed to pass through the first queue of the first node at the first moment may be understood as maximum traffic that is allowed to pass through the first queue of the first node at the first moment when bandwidth of a queue other than the first queue of the first interface reaches a preset standard. The first interface is an interface for transmitting the first queue. The preset standard may be set based on an actual application requirement. Content of the preset standard may not be limited in this embodiment of this application. For example, the preset standard may be: Total bandwidth of a queue other than the first queue of the first interface at the first moment is greater than total traffic entering the queue other than the first queue of the first interface at the first moment. Content of the preset standard may not be limited in this embodiment of this application.

Figure 4:
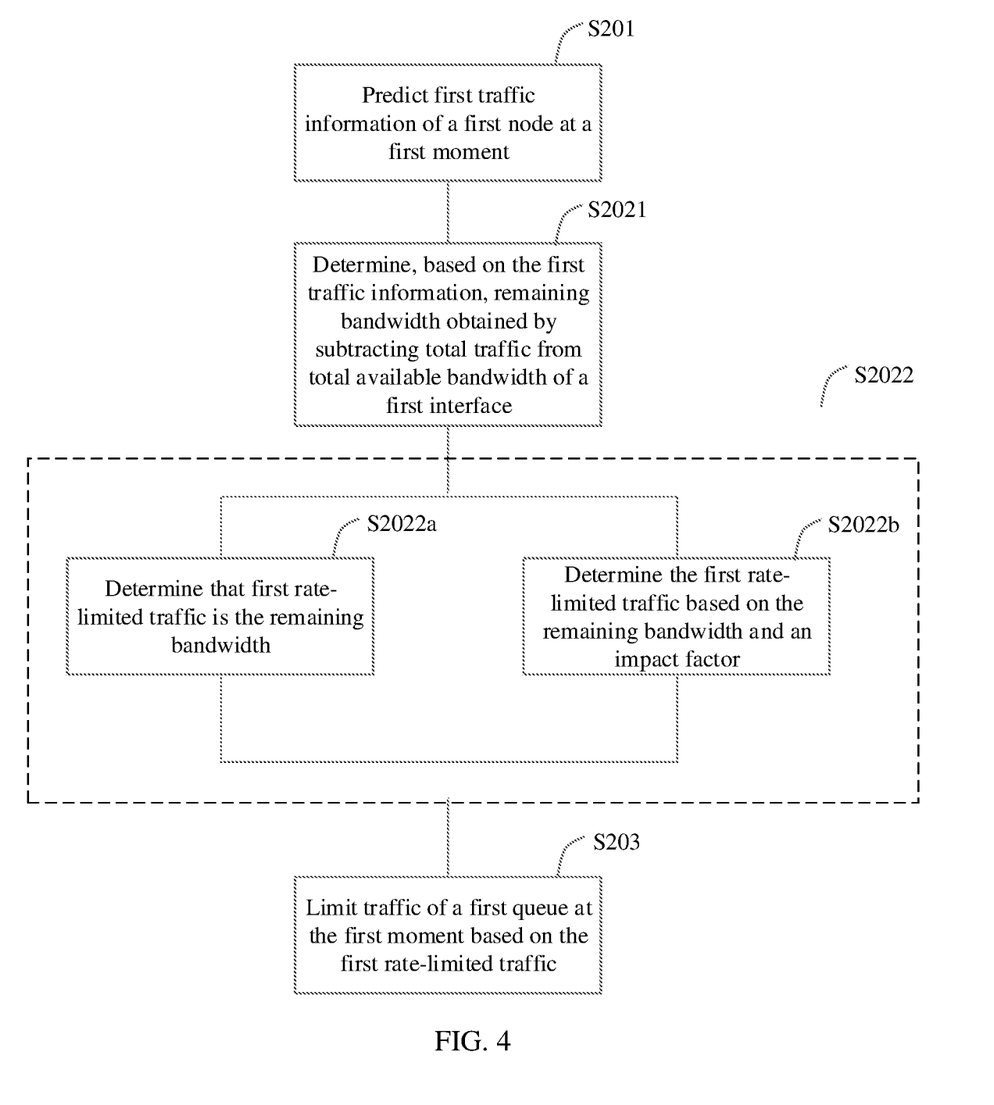
FIG. 4 is an example schematic flowchart 2 of a transmission control method according to an embodiment of this application.

In an implementation, as shown in FIG. 4, S202 may include S2021 and S2022.

S2021. The transmission control apparatus determines, based on the first traffic information, remaining bandwidth obtained by subtracting the total traffic from total available bandwidth of the first interface.

The first traffic information indicates the total traffic entering a queue other than the first queue of the first interface at the first moment.

For example, if the total available bandwidth of the first interface is 1000 Mbps, and the total traffic is 700 Mbps, the remaining bandwidth is 300 Mbps.

In addition, in this implementation, specific content of the first traffic information may not be limited. For example, the first traffic information may include a volume of traffic entering each queue of the first interface at the first moment, and then the total traffic may be determined by calculating a total traffic volume of a queue other than the first queue. For another example, the first traffic information may include the volume of traffic entering the first interface at the first moment and the volume of traffic entering the first queue at the first moment. Then, the total traffic may be determined by calculating a difference between the volume of traffic entering the first interface at the first moment and the volume of traffic entering the first queue at the first moment.

S2022. The transmission control apparatus determines the first rate-limited traffic based on the remaining bandwidth.

The following provides two possible implementations of this embodiment of this application, to implement a process of determining the first rate-limited traffic based on second traffic:

In a first possible implementation, S2022 includes the following.

S2022a. The transmission control apparatus determines that the first rate-limited traffic is the remaining bandwidth.

The foregoing Table 1 is used as an example, and the queue 3 is the first queue in this implementation. According to prediction, at the t1 moment, total traffic entering the queue 1, the queue 2, the queue 4, and the queue 5 is 900 Mbps (that is, the total traffic entering a queue other than the first queue of the first interface is 900 Mbps), and the remaining bandwidth is 100 Mbps. At the t2 moment, the total traffic entering the queue 1, the queue 2, the queue 4, and the queue 5 is 950 Mbps, and the remaining bandwidth is 50 Mbps. At the t3 moment, the total traffic entering the queue 1, the queue 2, the queue 4, and the queue 5 is 900 Mbps, and the remaining bandwidth is 100 Mbps.

That is, it is determined that the first rate-limited traffic corresponding to the t1 moment, the t2 moment, and the t3 moment is respectively 100 Mbps, 50 Mbps, and 100 Mbps. When 100 Mbps, 50 Mbps, and 100 Mbps are respectively used as maximum traffic that is allowed to pass through the queue 3 at the three moments, the volumes of traffic passing through the five queues are shown in Table 3.

TABLE 3

| Queue | Q | W | $B_{t1}$ (Mbps) | $B_{t2}$ (Mbps) | $B_{t3}$ (Mbps) |
|---|---|---|---|---|---|
| Queue 1 | PQ | — | 100 | 100 | 100 |
| Queue 2 | WFQ | 1 | 100 | 150 | 0 |
| Queue 3 | WFQ | 2 | 100 | 50 | 100 |
| Queue 4 | WFQ | 3 | 300 | 300 | 350 |
| Queue 5 | WFQ | 3 | 400 | 400 | 450 |

It can be learned that, at the three moments, because traffic of the queue 3 is limited, more bandwidth may be allocated to other queues, and queues other than the queue 3 are not congested. This ensures network quality of service of a service of another queue.

A second possible implementation is to avoid problems of great traffic fluctuation and frequent adjustment that may occur when maximum traffic of the first queue is sequentially adjusted at each moment. Table 3 is used as an example. If maximum traffic of the queue 3 is adjusted to 100 Mbps at the t1 moment, the maximum traffic of the queue 3 is adjusted to 50 Mbps at the t2 moment, and then the maximum traffic of the queue 3 is adjusted to 100 Mbps at the t2 moment, traffic of the queue 3 fluctuates greatly and is adjusted frequently. Therefore, in this implementation, S2022 includes the following.

S2022b. The transmission control apparatus determines the first rate-limited traffic based on the remaining bandwidth and an impact factor.

The impact factor includes at least one of the following: a congestion data volume of the first interface in a first time period, a quantity of changes of bandwidth allocated to the first queue in the first time period, and variation amplitude of the bandwidth allocated to the first queue in the first time period. The first time period is a time interval including the first moment.

For example, when other impact factors (the quantity of changes of the bandwidth allocated to the first queue in the first time period and the variation amplitude of the bandwidth allocated to the first queue in the first time period) are the same, the first rate-limited traffic of the first queue corresponding to each moment in the first time period is set, so that the congestion data volume of the first interface in the first time period is small.

For another example, when other impact factors (the congestion data volume of the first interface in the first time period and the variation amplitude of the bandwidth allocated to the first queue in the first time period) are the same, the first rate-limited traffic of the first queue corresponding to each moment in the first time period is set, so that the quantity of changes of the bandwidth allocated to the first queue in the first time period is as small as possible.

For still another example, when other impact factors (the congestion data volume of the first interface in the first time period and the quantity of changes of the bandwidth allocated to the first queue in the first time period) are the same, the first rate-limited traffic of the first queue corresponding to each moment in the first time period is set, so that the variation amplitude of the bandwidth allocated to the first queue in the first time period is as small as possible.

In other words, the first rate-limited traffic may be set to a value greater than the remaining bandwidth or less than the remaining bandwidth, so that the congestion data volume of the first interface in the first time period is as small as possible, the quantity of changes of the bandwidth allocated to the first queue in the first time period is as small as possible, and the variation amplitude of the bandwidth allocated to the first queue in the first time period is as small as possible.

For example, in an implementation process, a scoring standard may be set for each of the three impact factors, and different weight values may be assigned to the three impact factors. Further, the three impact factors are quantified into specific scores by using the scoring standards, and then the three impact factors are weighted and summed. Finally, an assignment value of the first rate-limited traffic may be determined based on a sum result.

Figure 5:
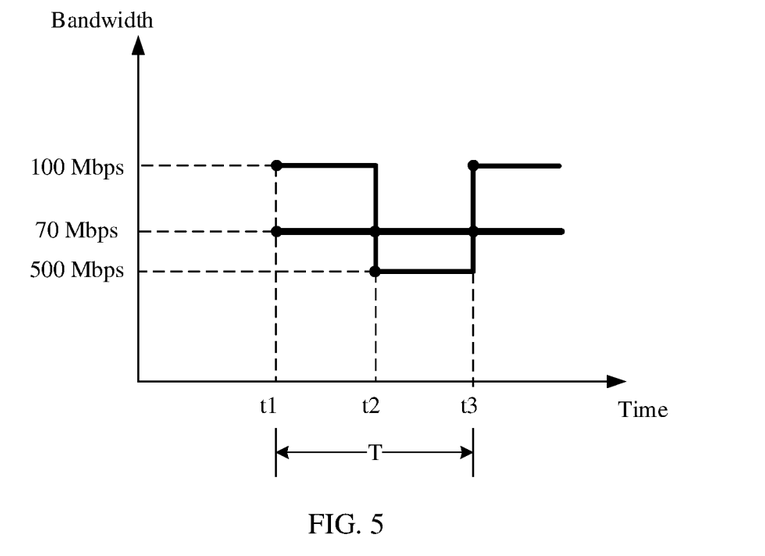
FIG. 5 is an example schematic diagram of maximum bandwidth of a queue 3 at a t1 moment, a t2 moment, and a t3 moment according to an embodiment of this application.

Table 3 is used as an example. To make the maximum traffic of the queue 3 be the remaining bandwidth (100 Mbps, 50 Mbps, and 100 Mbps) at the t1 moment, the t2 moment, and the t3 moment respectively, as shown in FIG. 5, adjustment needs to be performed at the t1 moment, the t2 moment, and the t3 moment respectively. However, if a congestion data volume of a transmission interface in a time period T, a quantity of changes of bandwidth allocated to queue 3 in the time period T, and variation amplitude of the bandwidth allocated to queue 3 in the time period T are considered, a more optimized result may be obtained. For example, the maximum traffic of the queue 3 is set to 70 Mbps at the t1 moment, the t2 moment, and the t3 moment. In this way, on a premise that the quality of service of the service of another queue is less affected, the maximum traffic of the queue 3 can be prevented from changing frequently, to improve smoothness and robustness of queue traffic.

S203. The transmission control apparatus limits traffic of the first queue at the first moment based on the first rate-limited traffic.

The following provides three implementations of limiting the traffic of the first queue at the first moment based on the first rate-limited traffic of this embodiment of this application:

In a first implementation, S203 may include the following.

S203a. The transmission control apparatus sends first configuration information to the first node based on the first rate-limited traffic.

The first configuration information indicates the first node to set maximum bandwidth of the first queue at the first moment.

For example, the first configuration information may include the value of the remaining bandwidth, and then the first node may limit, based on the value of the remaining bandwidth, the maximum bandwidth of the first queue at the first moment. Specifically, for example, the first node may configure rate-limiting bandwidth of the first queue at the first moment as the value of the remaining bandwidth. For another example, the first node may configure the rate-limiting bandwidth of the first queue at the first moment as an expected value of remaining bandwidth corresponding to the first queue in a period of time, and the like.

After receiving the first configuration information, the first node may achieve an effect of limiting the maximum bandwidth of the first queue by using a mechanism such as TCP rate reduction and retransmission. Reference may be made to related content in the current technology.

In a second implementation, S203 may include S203$b$1 and S203$b$2.

S203$b$1. Determine at least one second node from an upstream node of the first node.

For example, the at least one second node is a node on which an upstream queue of the first queue has a congestion risk at the first moment.

For example, the upstream node of the first node in this embodiment of this application may be understood as a node that can transmit data to the first node. For example, if the second node is the upstream node of the first node, it indicates that the second node is a transmission node that can transmit data to the first node. Similarly, an upstream queue of a queue in this embodiment of this application may be understood as a queue that can transmit data to the queue. For example, the upstream queue of the first queue is a queue that can transmit data to the first queue.

Using the network in FIG. 1 as an example, nodes that transmit data to the node C (the first node) through the interface a (a first interface to which the first queue belongs) include the node B, the node A, and the node D. Therefore, an upstream node of the node C includes the node B, the node A, and the node D.

An interface b is an interface that is of the node B and that transmits data to the interface a, an interface c is an interface that is of the node B and that receives data from the node A, an interface d is an interface that is of the node B and that receives data from the node D, an interface e is an interface that is of the node A and that transmits data to the interface c, and an interface f is an interface that is of the node D and that transmits data to the interface d. Therefore, the upstream queue of the first queue may include: a queue (denoted as queue-1) that is of the interface b and that can transmit data to the first queue, a queue (denoted as queue-2) that is of the interface c and that can transmit data to the first queue, a queue (denoted as queue-3) that is of the interface d and that can transmit data to the first queue, a queue (denoted as queue-4) that is of the interface e and that can transmit data to the first queue, and a queue (denoted as queue-5) that is of the interface f and that can transmit data to the first queue.

It should be noted that the foregoing example is merely an example for describing the interface and the queue in the network shown in FIG. 1, and a correspondence between the interface and the queue is not limited in this application. For example, in some implementations, one interface of one transmission node may receive data from a plurality of other transmission nodes. For another example, in some implementations, there may be a plurality of queues that are of one interface and that can transmit data to a same downstream queue.

In addition, that a queue has a congestion risk may be understood as that traffic entering the queue at a current moment is greater than a traffic threshold, or a data volume buffered in a current queue is greater than a data volume threshold.

The foregoing example is still used. If queue-1 and queue-4 have a congestion risk, it is determined that the at least one second node includes the node A and the node B.

It should be noted that, in some implementation processes, when a congestion risk of the upstream queue of the first queue is not considered, S203$b$1 may not be performed. For example, the upstream node of the first node may not be filtered. In this case, the at least one second node may include some or all upstream nodes of the first node. Further, second configuration information is sent to the at least one second node by using S203$b$2 below.

S203$b$2. The transmission control apparatus sends the second configuration information to the at least one second node based on the first rate-limited traffic.

The second configuration information indicates the at least one second node to set maximum bandwidth of the upstream queue of the first queue at the first moment.

The foregoing example is still used. The second configuration information is sent to some or all nodes of the node B, the node A, and the node D, so that the node B, the node A, and the node D may respectively limit maximum bandwidth of the upstream queue (some or all of queue-1, queue-2, queue-3, queue-4, and queue-5) of the first queue of the current node at the first moment. In this way, an effect of limiting the traffic of the first queue at the first moment can be achieved.

In a possible implementation, for each of the at least one second node, S203$b$ may be specifically implemented by using S1 and S2.

S1. The transmission control apparatus determines second rate-limited traffic of a second queue in a queue set at a first moment based on the first rate-limited traffic and a weight of the second queue.

The second queue is an upstream queue of the first queue of the second node. The queue set is a set of an upstream queue of the first queue of the at least one second node. The second rate-limited traffic indicates maximum traffic that is allowed to pass through the second queue at the first moment.

A weight of each queue in the queue set may be specifically determined based on information such as importance of a service carried in the queue, total traffic of an interface to which the queue belongs, and a congestion data volume of the interface to which the queue belongs. For example, if a service carried in the second queue is an important service or a service carried in the second queue is a delay-sensitive service, a weight value of the second queue is large, and corresponding second rate-limited traffic is large. Then, the second configuration information is sent to the second node based on the second rate-limited traffic, so that large maximum bandwidth may be configured for the second queue at the first moment, to ensure normal transmission of traffic of the second queue at the first moment.

S2. Send the second configuration information to the second node based on the second rate-limited traffic.

The second configuration information indicates the second node to set maximum bandwidth of the second queue at the first moment.

For example, the second configuration information may include the second rate-limited traffic, and the second node may limit, based on the second rate-limited traffic, the maximum bandwidth of the first queue at the first moment. Specifically, for example, the second node may configure rate-limiting bandwidth of the second queue at the first moment as the maximum traffic that is allowed to pass through the second queue at the first moment. For another example, the second node may configure the rate-limiting bandwidth of the second queue at the first moment as an expected value of maximum traffic that is allowed to pass through the second queue at the first moment in a period of time, and the like.

In a third implementation, S203 includes the following.

S203c. The transmission control apparatus sends third configuration information to target user equipment based on the first rate-limited traffic.

The target user equipment is a device that sends a data flow of a service carried in the first queue. The target user equipment may be a device configured to implement an application layer function, such as a desktop computer, a portable computer, a network server, a personal digital assistant (PDA), a mobile phone, a tablet computer, a wireless terminal device, or an embedded device.

For example, in FIG. 1, the target user equipment may include a mobile phone UE 1 and a computer UE 2. The UE 1 and the UE 2 are devices that access a network via the node A, to send a data flow to the first queue of the interface a.

In addition, the third configuration information indicates the target user equipment to limit a data volume transmitted by using the first queue at the first moment.

For example, an instruction may be sent to an edge node (the node A) by using the transmission control apparatus, so that a process of S203c is implemented in a manner in which the node A sends the third configuration information to the target user equipment.

In addition, in a possible implementation, S203c specifically includes S3 and S4.

S3. The transmission control apparatus determines transmission time and transmission bandwidth of a target service in the first time period based on the first rate-limited traffic.

The first time period includes the first moment. The target service is a service whose data flow needs to be sent on the target user equipment by using the first queue.

S4. Send the third configuration information to the target user equipment, to enable the target user equipment to transmit, based on the transmission time and the transmission bandwidth, a data flow of the target service in the first time period.

In the foregoing implementation, it is considered that, when the service carried in the first queue is severely rate-limited, the transmission control apparatus may agree, with the target user equipment, transmission time and transmission bandwidth of a data volume that passes through the first queue, to implement stagger transmission, ensure bandwidth of a key service to the maximum, and maximize resource utilization on the entire network.

For example, as shown in FIG. 1, the transmission control apparatus sends the third configuration information (referred to as information 1) to the UE 1. The information 1 includes corresponding third configuration information sent by the transmission control apparatus to the UE 1 and the UE 2 separately, so that in a time interval $[T_s, T_t]$, the UE 1 sends a data flow in a time interval $[T_s, T_m]$ based on corresponding bandwidth, and the UE 2 sends a data flow in a time interval $[T_m, T_t]$ based on corresponding bandwidth, to implement the stagger transmission.

In the foregoing method according to this embodiment of this application, traffic information of the first node at the first moment is first predicted by using the traffic information of the first node at the M sample moments. Then, the maximum traffic that is allowed to pass through the first queue of the first node at the first moment is determined based on the predicted first traffic information. Then, the traffic of the first queue at the first moment is limited based on the maximum traffic that is allowed to pass through the first queue at the first moment. In this way, when congestion occurs at the first moment, traffic of the first queue is limited, to ensure normal traffic transmission of another queue (which may be a queue for transmitting a service with higher importance).

It may be understood that, to implement corresponding functions, the foregoing transmission control apparatus includes corresponding hardware structures and/or corresponding software modules for performing the functions. In this embodiment of this application, function module division is performed on the transmission control apparatus based on the foregoing method examples. For example, each function module may be obtained through division based on a corresponding function, or two or more functions may be integrated into one processing module. The foregoing integrated module may be implemented in a form of hardware, or may be implemented in a form of a software function module. Optionally, in embodiments of this application, module division is an example, and is merely logical function division. In actual implementation, another division manner may be used.

Figure 6:
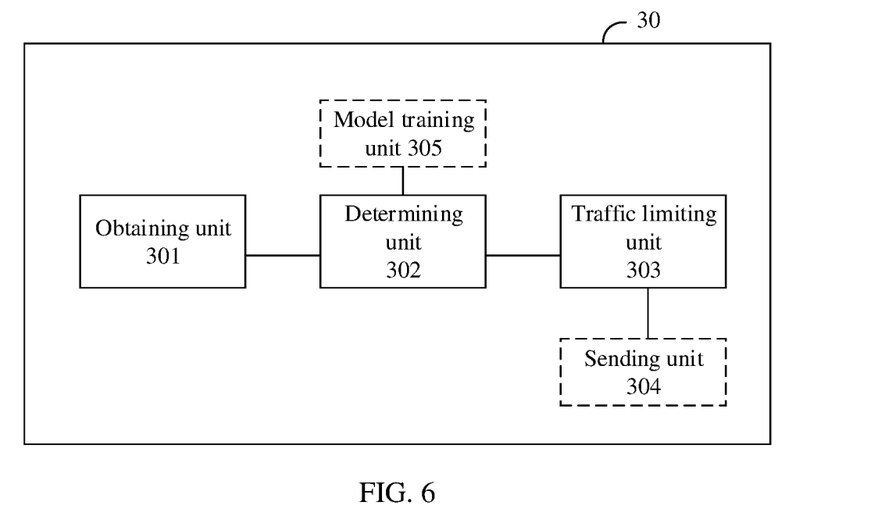
FIG. 6 is an example schematic diagram 2 of a structure of a transmission control apparatus according to an embodiment of this application.

FIG. 6 is a schematic composition diagram of a transmission control apparatus according to an embodiment of this application. A transmission control apparatus 30 may be a chip or a system on chip. The transmission control apparatus 30 may be configured to perform the transmission control method according to the foregoing embodiments, for example, perform the method corresponding to the transmission control apparatus in FIG. 3 and FIG. 4. In an implementation, the transmission control apparatus 30 may include:

an obtaining unit 301, configured to obtain traffic information of a first node at M sample moments, where M is a positive integer greater than or equal to 1;

a determining unit 302, configured to determine first traffic information of the first node at a first moment based on the traffic information of the first node at the M sample moments, where the first moment does not belong to the M sample moments, where the determining unit 302 is further configured to determine first rate-limited traffic based on the first traffic information, where the first rate-limited traffic indicates maximum traffic that is allowed to pass through a first queue of the first node at the first moment; and a traffic limiting unit 303, configured to limit traffic of the first queue at the first moment based on the first rate-limited traffic.

Optionally, the first traffic information indicates total traffic entering a queue other than the first queue of a first interface at the first moment. The first interface is an interface for transmitting the first queue.

The determining unit 302 is specifically configured to determine, based on the first traffic information, remaining bandwidth obtained by subtracting the total traffic from total available bandwidth of the first interface.

The determining unit 302 is further specifically configured to determine the first rate-limited traffic based on the remaining bandwidth.

Optionally, the determining unit 302 is specifically configured to determine the first rate-limited traffic based on the remaining bandwidth and an impact factor. The impact factor includes at least one of the following: a congestion data volume of the first interface in a first time period, a quantity of changes of bandwidth allocated to the first queue in the first time period, and variation amplitude of the bandwidth allocated to the first queue in the first time period. The first time period includes the first moment.

Optionally, the transmission control apparatus 30 may further include a sending unit 304. The sending unit 304 is configured to send first configuration information to the first node based on the first rate-limited traffic. The first configuration information indicates the first node to set maximum bandwidth of the first queue at the first moment.

Optionally, the sending unit 304 is configured to send second configuration information to at least one second node based on the first rate-limited traffic. The second node is an upstream node of the first node, and the second configuration information indicates the at least one second node to set maximum bandwidth of an upstream queue of the first queue at the first moment.

Optionally, the sending unit 304 is specifically configured to: for each of the at least one second node,
  determine second rate-limited traffic of a second queue in a queue set at the first moment based on the first rate-limited traffic and a weight of the second queue, where the second queue is an upstream queue of the first queue of the second node, and the queue set is a set of an upstream queue of the first queue of the at least one second node; and send the second configuration information to the second node based on the second rate-limited traffic, where the second configuration information indicates the second node to set maximum bandwidth of the second queue at the first moment; and
  send third configuration information to user equipment based on the first rate-limited traffic, where the user equipment is a device that sends a data flow of a service carried in the first queue, and the third configuration information indicates the user equipment to limit a data volume transmitted by using the first queue at the first moment.

Optionally, the apparatus further includes a model training unit 305. The model training unit 305 is configured to: before the determining unit determines the first traffic information of the first node at the first moment based on the traffic information of the first node at the M sample moments, train a machine learning model by using traffic information of the first node at H sample moments to obtain a prediction model, where H>M.

The determining unit 302 is specifically configured to determine the first traffic information based on the traffic information of the first node at the M sample moments and the prediction model.

Optionally, the first queue is a queue that meets at least one of the following: delay sensitivity of a service carried in the queue is lower than preset delay sensitivity, importance of the service carried in the queue is lower than preset importance, and a priority of the queue is lower than a preset priority.

An embodiment of this application further provides a chip. The chip includes a processor. When the processor executes computer program instructions, the chip is enabled to perform the method according to embodiments of this application, for example, perform the method corresponding to the transmission control apparatus in FIG. 3 and FIG. 4. The instructions may come from a memory inside the chip, or may come from a memory outside the chip. Optionally, the chip further includes an input/output circuit used as a communication interface.

An embodiment of this application further provides a computer-readable storage medium. The computer-readable storage medium stores instructions. When the instructions are run, the method according to embodiments of this application is performed, for example, the method corresponding to the transmission control apparatus in FIG. 3 and FIG. 4 is performed.

An embodiment of this application further provides a computer program product including instructions. When the instructions are run on a computer, the computer is enabled to perform the method according to embodiments of this application, for example, perform the method corresponding to the transmission control apparatus in FIG. 3 and FIG. 4.

All or some of functions, actions, operations, steps, and the like in the foregoing embodiments may be implemented by using software, hardware, firmware, or any combination thereof. When a software program is used to implement embodiments, all or some of embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. Although this application is described with reference to specific features and embodiments thereof, it is clear that various modifications and combinations may be made to them without departing from the spirit and scope of this application. Correspondingly, this specification and the accompanying drawings are merely example descriptions of this application defined by the appended claims, and are considered as any of or all modifications, variations, combinations or equivalents that cover the scope of this application. It is clearly that a person skilled in the art can make various modifications and variations to this application without departing from the spirit and scope of this application. In this way, this application is intended to cover these modifications and variations of this application provided that they fall within the scope defined by the claims of this application and their equivalent technologies.

What is claimed is:

1. A transmission control method, comprising:
  obtaining traffic information of a first node at M sample moments, wherein M is a positive integer greater than or equal to 1;
  determining first traffic information of the first node at a first moment based on the traffic information;
  determining first rate-limited traffic based on the first traffic information, wherein the first rate-limited traffic indicates maximum traffic allowed to pass through a first queue of the first node at the first moment; and
  limiting traffic of the first queue at the first moment based on the first rate-limited traffic.

2. The method according to claim 1, wherein
the first traffic information indicates total traffic entering a queue, other than the first queue, of a first interface at the first moment,
the first interface is configured to transmit data associated with the first queue, and
determining the first rate-limited traffic based on the first traffic information comprises:
  determining, based on the first traffic information, remaining bandwidth obtained by subtracting the total traffic from total available bandwidth of the first interface; and
  determining the first rate-limited traffic based on the remaining bandwidth.

3. The method according to claim 2, wherein determining the first rate-limited traffic based on the remaining bandwidth comprises:
determining the first rate-limited traffic based on the remaining bandwidth and an impact factor, wherein the impact factor includes at least one of: a congestion data volume of the first interface in a first time period, a quantity of changes of bandwidth allocated to the first queue in the first time period, or variation amplitude of the bandwidth allocated to the first queue in the first time period, wherein the first time period includes the first moment.

4. The method according to claim 1, wherein limiting the traffic of the first queue at the first moment based on the first rate-limited traffic comprises:
sending first configuration information to the first node based on the first rate-limited traffic, wherein the first configuration information indicates the first node to set a maximum bandwidth of the first queue at the first moment.

5. The method according to claim 1, wherein limiting the traffic of the first queue at the first moment based on the first rate-limited traffic comprises:
sending second configuration information to at least one second node based on the first rate-limited traffic, wherein
  the at least one second node is an upstream node of the first node, and
  the second configuration information indicates the at least one second node to set a maximum bandwidth of an upstream queue of the first queue at the first moment.

6. The method according to claim 5, wherein sending the second configuration information to the at least one second node based on the first rate-limited traffic comprises:
for each of a plurality of second nodes, including the at least one second node:
  determining second rate-limited traffic, of a second queue in a queue set at the first moment, based on the first rate-limited traffic and a weight of the second queue, wherein the second queue is an upstream queue of the first queue of the at least one second node, and the queue set is a set of an upstream queue of the first queue of the at least one second node; and
  sending the second configuration information to the at least one second node based on the second rate-limited traffic, wherein the second configuration information indicates the at least one second node to set a maximum bandwidth of the second queue at the first moment.

7. The method according to claim 1, wherein limiting the traffic of the first queue at the first moment based on the first rate-limited traffic comprises:
sending third configuration information to user equipment based on the first rate-limited traffic, wherein
  the user equipment includes a device configured to send a data flow of a service carried in the first queue, and
  the third configuration information indicates the user equipment to limit a data volume transmitted by using the first queue at the first moment.

8. The method according to claim 1, wherein before determining the first traffic information of the first node at the first moment based on the traffic information of the first node at the M sample moments, the method further comprises:
obtaining a prediction model by training a machine learning model by using traffic information of the first node at H sample moments, wherein H>M; and
determining the first traffic information based on the traffic information of the first node at the M sample moments and the prediction model.

9. The method according to claim 1, wherein the first queue meets at least one of the following criteria: delay sensitivity of a service carried in the first queue is lower than a specified delay sensitivity, importance of the service carried in the first queue is lower than a specified importance, or a priority of the first queue is lower than a specified priority.

10. An apparatus, comprising:
at least one processor; and
at least one memory configured to store computer readable instructions that, when executed by the at least one processor, cause the apparatus to:
  obtain traffic information of a first node at M sample moments, wherein M is a positive integer greater than or equal to 1;
  determine first traffic information of the first node at a first moment based on the traffic information;
  determine first rate-limited traffic based on the first traffic information, wherein the first rate-limited traffic indicates maximum traffic allowed to pass through a first queue of the first node at the first moment; and
  limit traffic of the first queue at the first moment based on the first rate-limited traffic.

11. The apparatus according to claim 10, wherein
the first traffic information indicates total traffic entering a queue, other than the first queue, of a first interface at the first moment,
the first interface is configured to transmit data associated with the first queue, and
the apparatus is further caused to:
  determine, based on the first traffic information, remaining bandwidth obtained by subtracting the total traffic from total available bandwidth of the first interface; and
  determine the first rate-limited traffic based on the remaining bandwidth.

12. The apparatus according to claim 11, wherein the apparatus is further caused to:
determine the first rate-limited traffic based on the remaining bandwidth and an impact factor, wherein the impact factor includes at least one of: a congestion data volume of the first interface in a first time period, a quantity of changes of bandwidth allocated to the first queue in the first time period, or variation amplitude of the bandwidth allocated to the first queue in the first time period, wherein the first time period includes the first moment.

13. The apparatus according to claim 10, wherein the apparatus is further caused to:
   send first configuration information to the first node based on the first rate-limited traffic, wherein the first configuration information indicates the first node to set a maximum bandwidth of the first queue at the first moment.

14. The apparatus according to claim 10, wherein the apparatus is further caused to:
   send second configuration information to at least one second node based on the first rate-limited traffic, wherein
      the at least one second node is an upstream node of the first node, and
      the second configuration information indicates the at least one second node to set a maximum bandwidth of an upstream queue of the first queue at the first moment.

15. The apparatus according to claim 14, wherein the apparatus is further caused to:
   determine second rate-limited traffic, of a second queue in a queue set at the first moment, based on the first rate-limited traffic and a weight of the second queue, wherein the second queue is an upstream queue of the first queue of the at least one second node, and the queue set is a set of an upstream queue of the first queue of the at least one second node; and
   send the second configuration information to the at least one second node based on the second rate-limited traffic, wherein the second configuration information indicates the at least one second node to set a maximum bandwidth of the second queue at the first moment.

16. The apparatus according to claim 10, wherein the apparatus is further caused to:
   send third configuration information to user equipment based on the first rate-limited traffic, wherein
      the user equipment includes a device configured to send a data flow of a service carried in the first queue, and
      the third configuration information indicates the user equipment to limit a data volume transmitted by using the first queue at the first moment.

17. The apparatus according to claim 10, wherein the apparatus is further caused to:
   obtain a prediction model by training a machine learning model by using traffic information of the first node at H sample moments, wherein H>M; and
   determine the first traffic information based on the traffic information of the first node at the M sample moments and the prediction model.

18. The apparatus according to claim 10, wherein the first queue meets at least one of the following criteria: delay sensitivity of a service carried in the first queue is lower than a specified delay sensitivity, importance of the service carried in the first queue is lower than a specified importance, or a priority of the first queue is lower than a specified priority.

19. A non-transitory computer-readable storage medium storing computer readable instructions that, when executed by a processor, cause the processor to provide execution comprising:
   obtaining traffic information of a first node at M sample moments, wherein M is a positive integer greater than or equal to 1;
   determining first traffic information of the first node at a first moment based on the traffic information;
   determining first rate-limited traffic based on the first traffic information, wherein the first rate-limited traffic indicates maximum traffic allowed to pass through a first queue of the first node at the first moment; and
   limiting traffic of the first queue at the first moment based on the first rate-limited traffic.

20. The non-transitory computer-readable storage medium of claim 19, wherein
   the first traffic information indicates total traffic entering a queue, other than the first queue, of a first interface at the first moment,
   the first interface is configured to transmit data associated with the first queue, and
   determining the first rate-limited traffic based on the first traffic information comprises:
      determining, based on the first traffic information, remaining bandwidth obtained by subtracting the total traffic from total available bandwidth of the first interface; and
      determining the first rate-limited traffic based on the remaining bandwidth.

* * * * *